United States Patent
Fetzer et al.

(10) Patent No.: US 6,944,751 B2
(45) Date of Patent: Sep. 13, 2005

(54) REGISTER RENAMING TO REDUCE BYPASS AND INCREASE APPARENT PHYSICAL REGISTER SIZE

(75) Inventors: Eric S. Fetzer, Longmont, CO (US); Donald C. Soltis, Jr., Fort Collins, CO (US); Stephen R. Undy, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 613 days.

(21) Appl. No.: 10/074,098

(22) Filed: Feb. 11, 2002

(65) Prior Publication Data

US 2003/0163672 A1 Aug. 28, 2003

(51) Int. Cl.[7] .............................................. G06F 9/312
(52) U.S. Cl. ........................................................ 712/218
(58) Field of Search ........................................ 712/218

(56) References Cited

U.S. PATENT DOCUMENTS

| | | | | |
|---|---|---|---|---|
| 5,535,346 A | * | 7/1996 | Thomas, Jr. | 712/217 |
| 5,835,968 A | * | 11/1998 | Mahalingaiah et al. | 711/214 |
| 5,944,811 A | * | 8/1999 | Motomura | 712/23 |
| 6,012,137 A | * | 1/2000 | Bublil et al. | 712/36 |
| 6,219,781 B1 | * | 4/2001 | Arora | 712/217 |
| 6,301,653 B1 | * | 10/2001 | Mohamed et al. | 712/214 |
| 6,304,955 B1 | * | 10/2001 | Arora | 712/217 |
| 6,430,679 B1 | * | 8/2002 | Heeb | 712/218 |
| 6,587,941 B1 | * | 7/2003 | Flacks et al. | 712/218 |
| 6,766,440 B1 | * | 7/2004 | Steiss et al. | 712/218 |

* cited by examiner

*Primary Examiner*—Eric Coleman

(57) ABSTRACT

The invention provides a processor architecture that bypasses data hazards. The architecture has an array of pipelines and a register file. Each of the pipelines includes an array of execution units. The register file has a first section of n registers (e.g., 128 registers) and a second section of m registers (e.g., 16 registers). A write mux couples speculative data from the execution units to the second set of m registers and non-speculative data from a write-back stage of the execution units to the first section of n registers. A read mux couples the speculative data from the second set of m registers to the execution units to bypass data hazards within the execution units. The register file preferably includes column decode logic for each of the registers in the second section of m registers to architect speculative data without moving data. The decode logic first decodes, and then selects, an age of the producer of the speculative state; the newest producer enables the decode.

18 Claims, 6 Drawing Sheets

| CYCLE | PIPELINE STAGES | | | |
|---|---|---|---|---|
| | F | R | E | W |
| 1 | i | | | |
| 2 | i1 | i | | |
| 3 | i2 | i1 | i | |
| 4 | i3 | i2 | i1 | i |

FIG. 6

| CYCLE | PIPELINES | | | | REGISTER FILE COLUMNS | | |
|---|---|---|---|---|---|---|---|
| | E | D | W | J | K | L |
| 1 | i | | | Rm, AN | free | free |
| 2 | i1 | i | | Rm, A | Rm, N | free |
| 3 | i2 | i1 | i1 | Rm, A | Rm, N-1 | Rm, N |
| 4 | i3 | i2 | i2 | Rm, N | Rm, A | Rm, N-1 |
| 5 | | i3 | i2 | Rm, N-1 | free | Rm, AN |

REGISTER RENAMING TO REDUCE BYPASS AND INCREASE APPARENT PHYSICAL REGISTER SIZE

BACKGROUND OF THE INVENTION

Figures 1, 2:
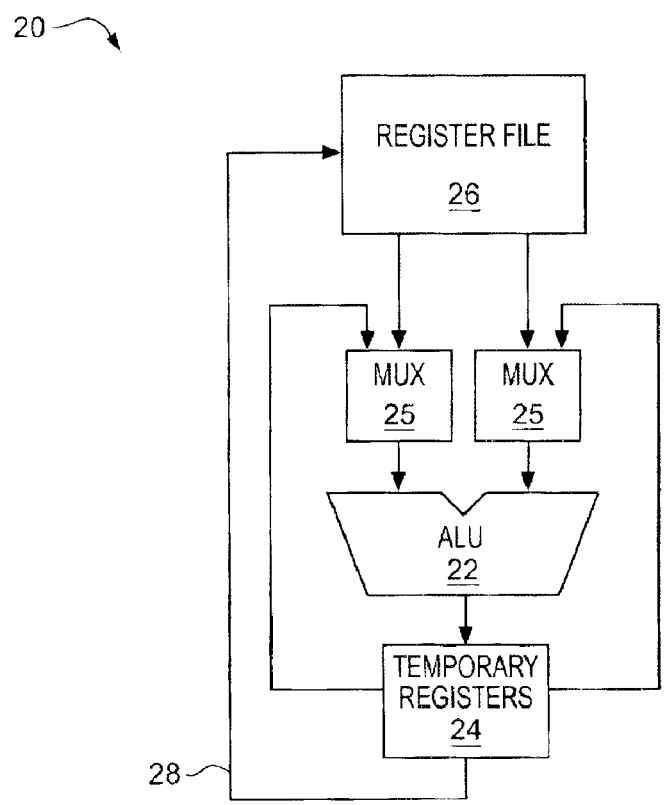

FIG. 1 shows a simplified four-stage pipeline architecture 10 illustrating parallel processing within a RISC microprocessor of the prior art. Architecture 10 has a series of pipeline stages 12 for each pipeline that process instructions i, i1, i2, i3, i4 (i1 is "younger" than i, and so on) by incremental clock cycles 16. As known to those skilled in the art, instructions i are acted upon by individual stages of the pipeline, such as the fetch stage F, the register read stage R, the execute stage E, and the write-back stage W. Within the CPU architecture 10, register files are typically written to, or "loaded," at the write-back stage W. Other stages may be included within the pipeline, including a detect exception stage D, known in the art, between stages E and W.

Those skilled in the art also understand that data hazards may occur within the pipeline. These hazards may derive from a number of sources, including data interdependencies. One prior art solution to such data hazards is called "bypassing" or "data forwarding," as illustrated by the data forwarding logic 20 of FIG. 2. The purpose of data forwarding is is to supply the "newest" data to the pipelines. Data forwarding logic 20 is essentially part of each CPU pipeline; it stores the output of the execution unit 22 (shown as an ALU) within temporary registers 24 for input to unit 22, generally through a mutiplexer ("mux") 25, as an operand in subsequent instructions. Once an instruction is finalized, the data is architected into the CPU's register file 26 at the write-back stage, illustrated by feedback line 28. Multiplexers 25 serve to couple data between register file 26, temporary registers 24 and unit 22, as shown. Data forwarding thus provides a performance boost to CPU architectures by reducing execution latency.

Figure 3:
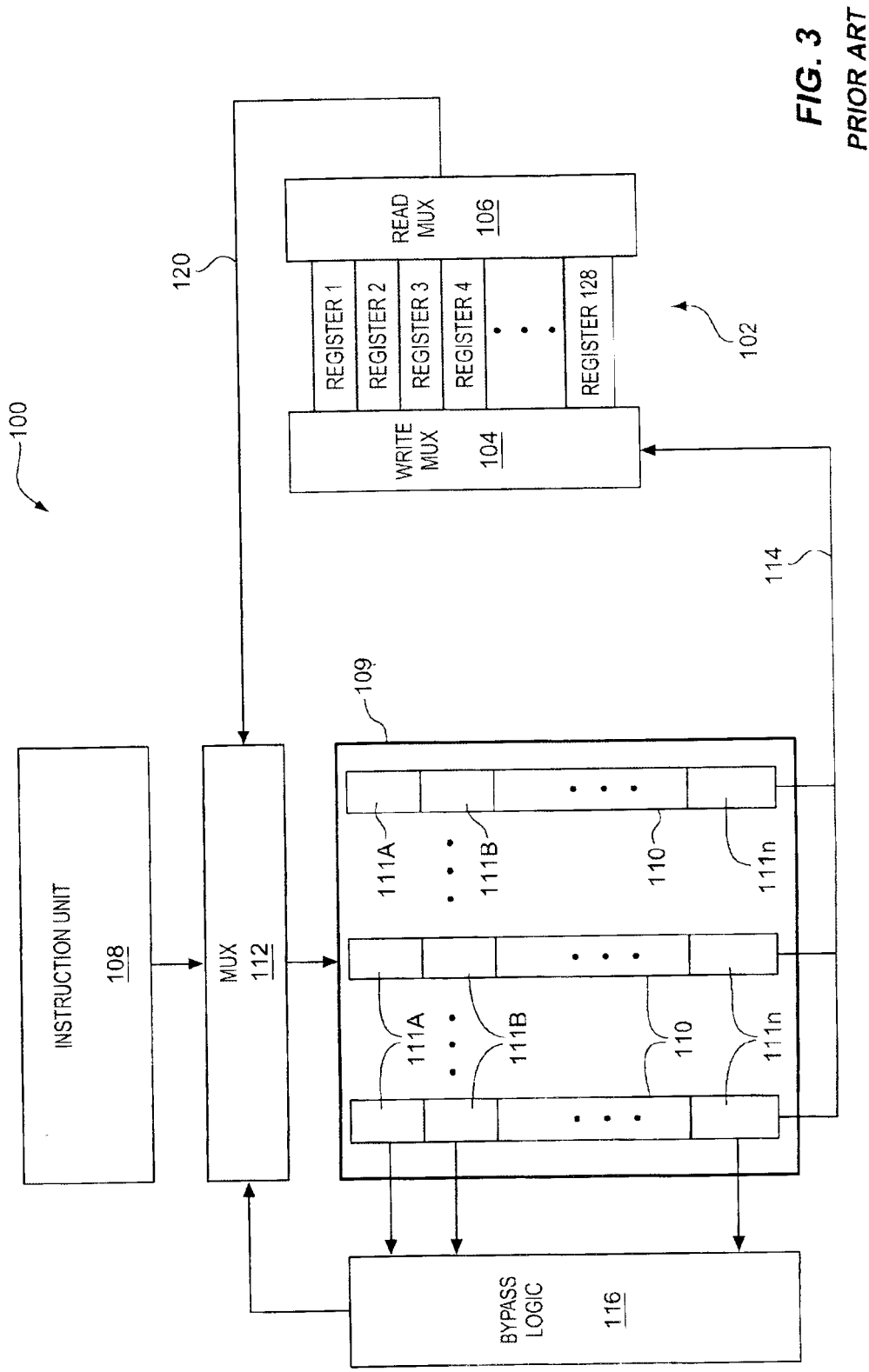

Data within temporary registers 24 are sometimes denoted as "speculative" since the instruction is not committed until the write-back stage 28 to register file 26. FIG. 3 shows another prior art architecture 100 for bypassing through a high performing RISC processor utilizing a register file 102 with 128 64-bit registers. Register file 102 has 12 read ports processed through a read mux 106, and 8 write ports processed through a write mux 104. In operation, an instruction unit 108 provides instructions to an execution unit 109 with an array of pipeline execution units 110 through a mux 112. Pipeline execution units 110 have execution stages 111a–111n so as to perform, for example, F,R,E,W described above. Pipeline stage 111n may for example architect any of the registers within register file 102 as a write-back stage W, through data bus 114 and write mux 104 (supporting 8 write ports). Individual stages 111 of pipelines 110 may transfer speculative data to other execution units through bypass logic 116 and mux 112; this speculative data may reduce hazards within other individual stages 111 in providing the data forwarding capability for architecture 100. Data may be read from register file 102 through read mux 106 (supporting 12 read ports) and data bus 120.

One difficulty of implementing the bypassing architectures and logic of FIG. 3 stems from the number of stages between register read (R) and register write (W) times the number of instructions in the execution stages (the "execution width"). For a 6-wide execution pipeline, for example, any one stage (e.g., stage 111b) will hold six instructions for the same cycle, plus two load return ports, for a total of eight. Accordingly, eight times three stages (from R to W) equals twenty-four plus the register file, effectively requiring a 25-to-1 mux. Moreover, since each instruction has two operands, this relationship is doubled and then multiplied by the number of execution pipelines (6 in this example), resulting in twelve copies of the 25-to-1 mux. Such a design thus generates 25 sources per operand in the pipeline; the mux and bypass logic implementing this design utilizes a significant fraction of the total cycles per instruction. The need exists to reduce (a) this time and (b) the size of the associated area used to implement the bypass logic.

It is, accordingly, one object of the invention to provide methods and systems for reducing the complexity of bypass logic in the CPU. Other objects of the invention are apparent within the description that follows.

SUMMARY OF THE INVENTION

As used herein, an instruction is a "producer" when that instruction produces data to be written to a register and that data is available for bypassing or data forwarding. An instruction is a "consumer" when that instruction utilizes the bypass data. An "age" associates with the data from a producer so that a consumer consumes the newest bypass data (i.e., that data from the producer with the "youngest" age).

In one aspect, the invention provides processor architecture including a register file with (a) a first array of registers for the architected states of fully processed instructions and (b) a second array of registers for data forwarding related to speculative transactions. A read port mux feeds back the speculative data from the second array of registers to pipeline stages to accomplish data forwarding.

The architecting of speculative states within the second array of registers may occur without moving data. Specifically, in one aspect of the invention, the register file column decode logic first decodes, and then selects, an age of the producer of the speculative state. The newest producer thus enables the decode. After an update to a column's rename register, a read or write regid will match that rename register if (a) it is the newest data and (b) it is the column selected for read or write. One advantage of the decode logic is that additional write ports are not required to move the data. This decode logic may be used generally with other register file architectures to incorporate renaming, to an architected state, without moving data.

The invention is next described further in connection with preferred embodiments, and it will become apparent that various additions, subtractions, and modifications can be made by those skilled in the art without departing from the scope of the invention.

BRIEF DESCRIPTION OF THE EMBODIMENTS

Figure 4:
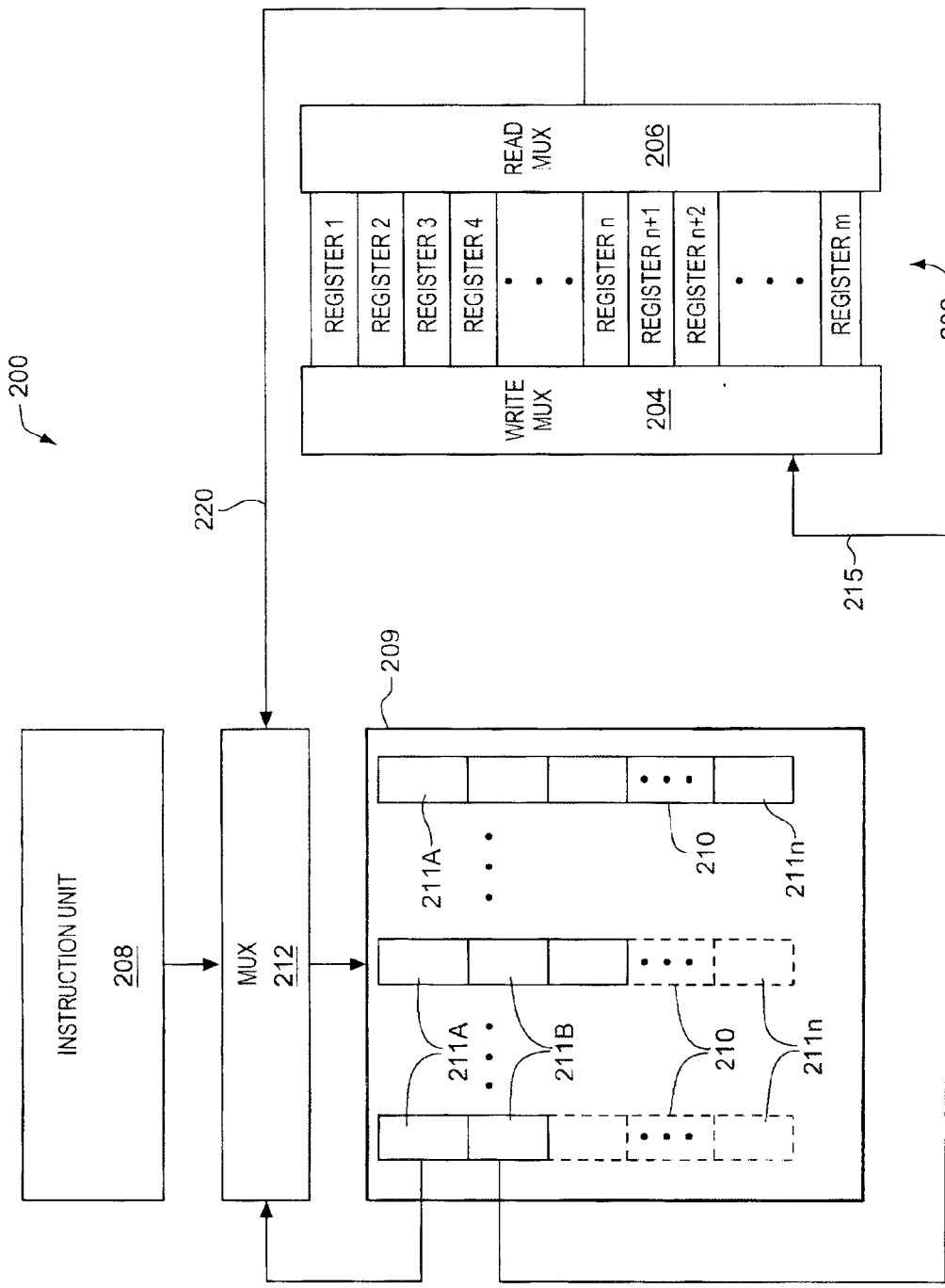
Figure 5:
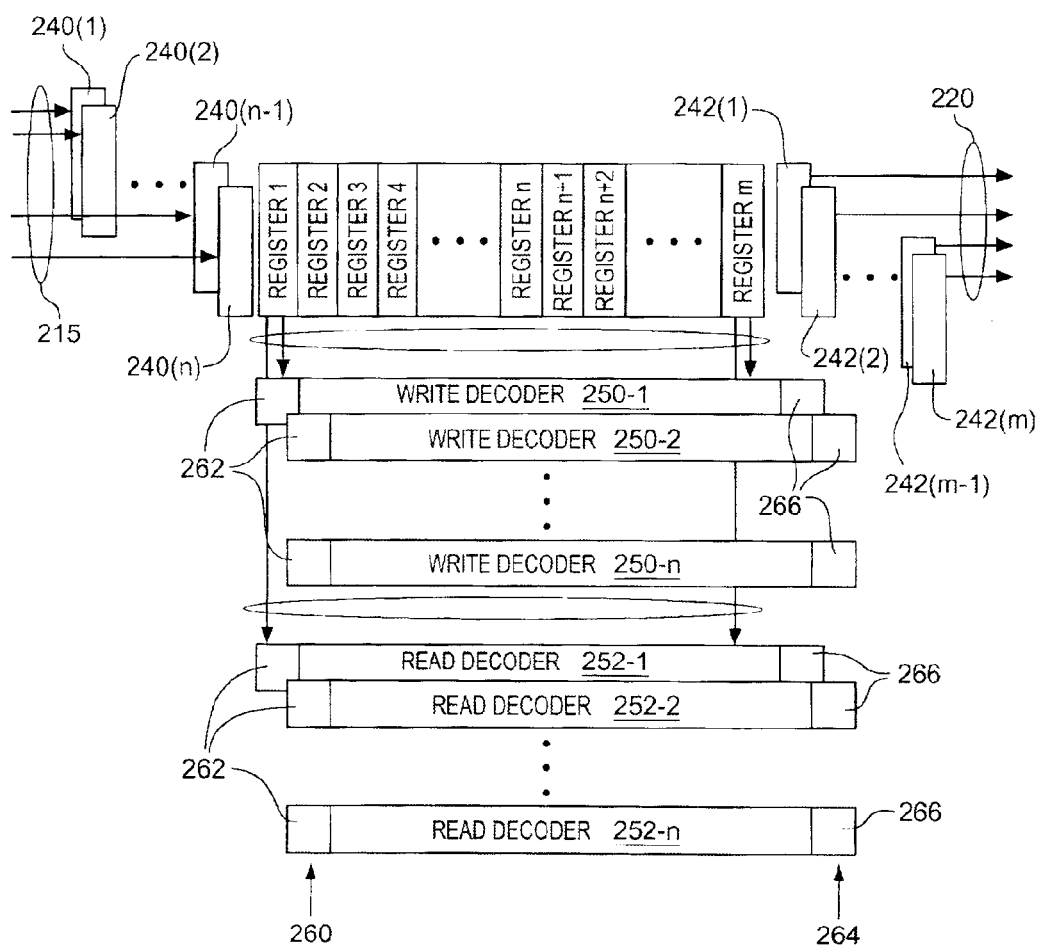
Figure 7:
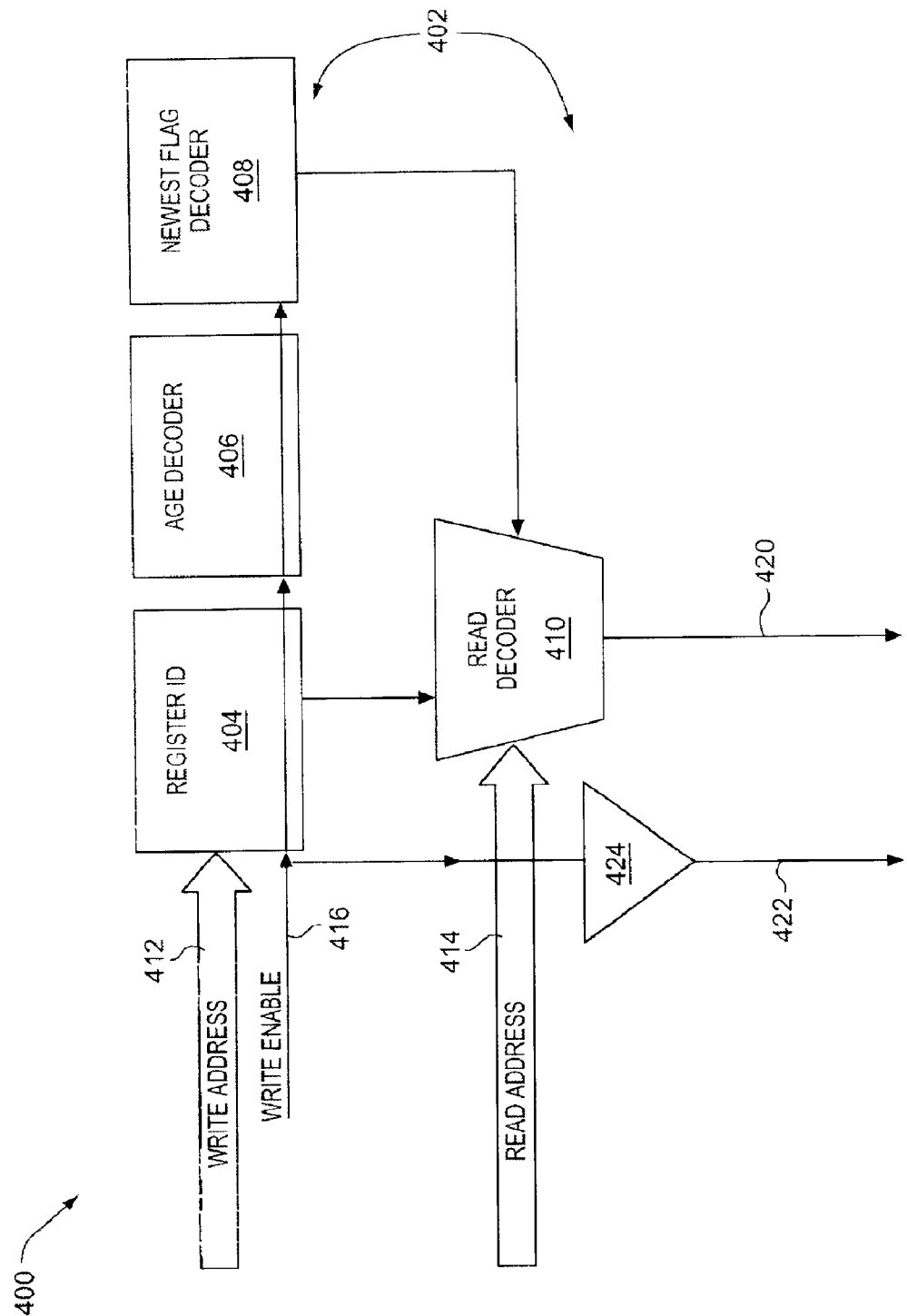

A more complete understanding of the invention may be obtained by reference to the drawings, in which:

FIG. 1 illustrates pipeline processing architecture of the prior art;

FIG. 2. schematically illustrates bypass logic of the prior art;

FIG. 3 schematically illustrates a 128-register file RISC processor logic with bypass circuitry of the prior art;

FIG. 4 schematically illustrates processor logic of the invention incorporating an enhanced register file to facilitate bypassing with decreased bypass logic and multiplexing;

FIG. 5 schematically illustrates a register file and accompanying decode logic of the invention;

FIG. 6 illustrates pipeline processing, and associated bypass architected states within register file columns, in accord with the invention; and FIG. 7 shows operational logic flow associated with the decode logic of FIG. 5.

DETAILED DESCRIPTION OF THE DRAWINGS

The invention reduces complexity of bypassing logic in the prior art by adding additional registers within the register file and by using decoders to perform bypassing, as illustrated and described in connection with FIG. 4, FIG. 5, FIG. 6 and FIG. 7. In particular, FIG. 4 shows an architecture 200 for bypassing through a high performing RISC processor utilizing a register file 202 with n registers (registers 1–n), providing primary register file read and write data functions, and m registers (registers n+1–m) providing data forwarding. An instruction unit 208 provides instructions to an execution unit 209 with an array of pipeline execution units 210 through a mux 212. Pipeline execution units 210 have execution stages 211a–211n so as to perform, for example, F,R,E,W described above. In non-speculative transactions, pipeline stage 211n architects any of the registers 1–n within register file 202 as a write-back stage W, through data bus 215 and write mux 204. In speculative transactions, a stage 211 of pipelines 210 may write speculatively to registers n+1–m via data bus 215 and write mux 204. As described below, the register file decoders thereafter ages the speculative writes to the architected state. Those skilled in the art should appreciate that the speculative transactions discussed above may alternatively occur throughout registers 1–n, n+1–m and without co-locating speculative registers as shown in FIG. 4, as a matter of design choice.

The read and write ports and muxes 204, 206 of register file 202 may be illustrated as in FIG. 5. Each of the write ports 240(1)–(n) has an associated write decoder 250(1)–(n) to decode appropriate words to be written to register file 202. Bus 215 illustratively feeds into write-ports 240, as shown. Each of the read ports 242(1)–(m) has an associated read decoder 252(1)–(m) to decode appropriate words to be read from register file 202. Bus 220 couples from write-ports 242 to mux 212, as shown. In the preferred embodiment, the invention speeds the process of architecting speculative states in registers n+1–m, without moving data, by utilizing the decode logic of decoders 250, 252 to decode, and then select, an age of the producer of the speculative state. In effect, the newest producer enables decode. FIG. 6 illustrates this process further.

FIG. 6 shows a pipeline architecture 300 with a series of pipelines 312 processing speculative instructions i, i1, i2, i3, through sequential clock cycles 314. FIG. 6 also shows register file columns 316, each column (J, K or L) representing (a) a register within registers n+1–m of register file 202 and (b) associated decode logic 250, 252. FIG. 5 for example shows a column 260, which includes register 0 and corresponding decoders 262, and a column 264, which includes register m and corresponding decoders 266. In operation, instructions i, i1, i2, i3 may process through execution stage E, detect exception stage D, and write-back stage W, as shown. Speculative data is written to registers of columns 316 through speculative write bus 215, FIG. 5.

Generally, architecture 300 operates as follows: an instruction i writes a speculative value to a register file column 316; i1 writes a speculative value to a register file column 316 and the last value from i is aged; i2 writes a speculative value to a register file column and i becomes architected; the result from i1 is then aged. More particularly, at cycle 1, column J holds register M as the newest (N) architected (A) state (denoted herein as (Rm, AN)). At cycle 2, column K holds the newest speculative data (Rm,N) from instruction i1. At cycle 3, column L holds the newest speculative data (Rm,N) from instruction i2; column K also ages from newest to the next newest (N–1) architected state (denoted herein as (Rm,N–1)). At cycle 4, column J holds the newest speculative data (Rm, N) and column K is architected, as data (Rm,A), from instruction i1; column L ages as shown to (Rm,N–1). At cycle 5, column J holds the newest speculative data (Rm, N–1) and column K is architected from instruction i2.

FIG. 7 shows a block schematic 400 illustrating operation of write and read decoders 250, 252, in accord with one preferred embodiment of the invention. A register file column (e.g., a register column J, K or L, FIG. 6) may for example include logic illustrated by block schematic 400. Block schematic 400 shows a write decoder 402, including a register ID 404, an age decoder 406, and a newest flag decoder 408, and a read decoder 410. Write decoder 402 receives a write address 412 representing a k-bit value for the register (e.g., one of registers 1–n, n+1–m) to be written to on bus 215. Read decoder 410 receives a read address 414 representing an k-bit value for the register to be read from bus 220. Write decoder 402 updates the column's rename register to a newly allocated register ID. Register ID 404 equals write address 412 when decoder 402 is write-enabled, indicated by write enable control line 416. Age decoder 406 advances the age for the decode column: age is set to the newest value when write enable is 1; age increases with each cycle until architected state age is reached. For example, age decoder 406 advances the decode column with age N to N–1, or with age N–1 to A. Newest flag decoder 408 identifies the newest speculative data. Specifically, the newest flag is set on write enable 416; the newest flag is unset when write address 412 equals register ID 404 and write enable equals zero. Read decoder 410 activates the read word-line 420 if (a) the read address equals register ID 404 and (b) it corresponds to the newest flag (from decoder 408). The write word-line 422 may couple from decoder 402 through buffer 424, as shown.

In an illustrative operation, for example as shown with cycle 2, FIG. 6, write decoder 402 updates column K's rename register to m, and age decoder 406 sets column K's age to N. Similarly, in cycle 3, column L's rename register updates, and its age to N, which will advance column K's age from N to N–1. After an update to a column's rename register, a read or write register ID will match that rename register if (a) it is the newest data and (b) it is the column selected for read or write. Note that there is always one column tagged with 'newest' indication (N) for a set with the same rename value. So, as indicated in cycle 1, column J shows Rm,AN (architected and newest).

The key features for operations illustrated within FIG. 7 include:

- If flush occurs and age does not equal architected state, then register ID 404 is made available
- If flush occurs and age does not equal architected state, then the newest flag (from decoder 408) is de-asserted
- If flush occurs and age equals architected state, then the newest flag (from decoder 408) is asserted
- If another register with the same ID ages to architected state, then register ID 404 is made available; this is predicted by tracking pipeline advances through W stage after another register is written with the same ID, determined because write address 412 equals register ID 404 with write enable =0.

A register ID, when written, asserts the newest flag

A register ID write matches the old register ID and de-asserts this as not newest flag Register IDs can only be written if the register is available Control logic controls write enable 416 such that write enable only activates when register ID is made available In addition to the advantages apparent in the preceding description, the invention also provides 'back-up' capability if a pipeline flush (e.g., a branch re-steer) cancels the non-architected sets. For example, with the N, N−1 notation of FIG. 6 replaced by pipe stage names, column J would start with (Rm,E,N), indicating the rename register contains m, mapping column J to register m with an age corresponding to instruction in stage E; the notation also indicates that this is the newest value of regid m. The next cycle for column J is then (Rm,D), indicating that it is still renamed regid m, corresponding to instruction in stage D; but it also indicates that this is no longer the newest as some other column was renamed to regid m. If a flush occurs, column J is invalidated, and may be denoted as (Rm,INV); whichever column held (Rm,) would therefore become Rm,AN.

Additional advantages of the invention are apparent with reference to FIG. 4. In particular, the logical architecture of read and write muxes 204, 205, 206, respectively, as compared to muxes 104, 106 of FIG. 3, respectively, is not as complex as the bypass logic 116 and related architecture of FIG. 3. In the preferred embodiment of the invention, register file 202 has 128 registers for registers 1−n, and 16 registers for registers n+1−m. The latter 16 registers may for example serve to provide speculative data for stages 211 in bypassing data hazards; however any of registers 1−m may be used as a matter of design choice. The invention thus reduces wiring requirements within the 64-bit CPU.

The invention thus attains the objects set forth above, among those apparent from the preceding description. Since certain changes may be made in the above methods and systems without departing from the scope of the invention, it is intended that all matter contained in the above description or shown in the accompanying drawing be interpreted as illustrative and not in a limiting sense. It is also to be understood that the following claims are to cover all generic and specific features of the invention described herein, and all statements of the scope of the invention which, as a matter of language, might be said to fall there between.

Having described the invention, what is claimed is:

1. A method for data forwarding within a processor architecture of the type having an array of pipelines and a register file, comprising the steps of:

architecting data from write-back stages of the pipelines to a first section of n registers of the register file;

writing speculative data from the pipelines to a second section of m registers of the register file;

reading the speculative data from the second section of m registers based upon an age of the speculative data; and forwarding the speculative data to the pipelines to bypass data hazards therein.

2. The method of claim 1, further comprising the step of processing instructions through the pipelines.

3. The method of claim 2, further comprising the step of architecting data to the first section of n registers after processing one of the instructions through a write-back stage of one of the pipelines.

4. The method of claim 1, further comprising utilizing decode register file column logic of the register file to architect speculative data within the second section of m registers without moving data.

5. The method of claim 4, the decode register file column logic decoding and selecting the age of the speculative data to enable architecting of the speculative data.

6. The method of claim 4, the decode register file column logic determining whether the speculative data has a newest age.

7. The method of claim 4, the decode register file column logic determining whether a particular column is selected for one of read or write operations.

8. A processor architecture for bypassing data hazards, comprising (a) an array of pipelines, each of the pipelines having an array of execution units, (b) a register file having a first section of n registers and a second section of m registers, and (c) a read mux for coupling speculative data from the execution units to the second set of m registers and for coupling the speculative data from the second set of m registers to the execution units, to bypass data hazards within the execution units.

9. The processor architecture of claim 8, further comprising a write mux for coupling non-speculative data from a write-back stage of the execution units to the first section of n registers.

10. The processor architecture of claim 9, further comprising a first bus structure for communicating the non-speculative data between the execution units and the write mux.

11. The processor architecture of claim 10, the first bus structure communicating the speculative data between the execution units and the write mux.

12. The processor architecture of claim 8, the register file comprising column decode logic for each of the registers in the second section of m registers, for architecting speculative data within the second section of m registers without moving data.

13. The processor architecture of claim 12, the column decode logic decoding speculative data to determine an age therewith.

14. The processor architecture of claim 13, the column decode logic comprising an age decoder for determining the age.

15. The processor architecture of claim 13, the column decode logic (a) determining whether the age is a newest age and whether a register associated with the decode logic is selected for a write or read operation, and (b) architecting the register if the data is the newest and the register is selected for the write or read operation.

16. The processor architecture of claim 15, the column decode logic comprising a write decoder for architecting the register.

17. The processor architecture of claim 8, the section of n registers comprising 128 registers.

18. The processor architecture of claim 8, the section of m registers comprising 16 registers.

* * * * *